United States Patent [19]

Endo et al.

[11] 4,246,566
[45] Jan. 20, 1981

[54] MALFUNCTION DIAGNOSING APPARATUS FOR ELECTRONIC CONTROL SYSTEM FOR VEHICLES

[75] Inventors: Kunio Endo, Anjo; Nobuyuki Kobayashi, Toyota; Haruo Watanabe; Mitsuo Kawai, both of Okazaki, all of Japan

[73] Assignees: Nippondenso Co., Ltd., Kariya; Toyota Jidosha Kogyo Kabushiki Kaisha, Toyota, both of Japan

[21] Appl. No.: 30,932

[22] Filed: Apr. 17, 1979

[30] Foreign Application Priority Data

May 9, 1978 [JP] Japan ................................ 53-55319

[51] Int. Cl.³ ............................................ G08B 29/00
[52] U.S. Cl. ............................ 340/52 F; 340/514; 340/524
[58] Field of Search .................... 340/52 F, 506, 511, 340/514, 515, 517, 519, 521, 524, 525

[56] References Cited

U.S. PATENT DOCUMENTS 3,958,240 5/1976 Richardson ....................... 340/525
4,118,688 10/1978 Glennon ........................... 340/52 F Primary Examiner—Alvin H. Waring
Attorney, Agent, or Firm—Cushman, Darby & Cushman

[57] ABSTRACT

An apparatus for diagnosing a malfunction of an electronic control system including sensors for electrically sensing conditions of sensing points of a vehicle and an electronic calculation unit for determining an energizing condition of an actuator for controlling a vehicle operation in accordance with output signals from the sensors is disclosed. The malfunction diagnosing apparatus is inserted intermediate of wires which connect the sensors or the actuator and the electronic control system, and when a voltage or current level on any wire assumes a non-steady state, the malfunction diagnosing apparatus determines that a malfunction has occurred at a portion associated with that wire and memorizes and holds the occurrence of the malfunction.

3 Claims, 3 Drawing Figures

MALFUNCTION DIAGNOSING APPARATUS FOR ELECTRONIC CONTROL SYSTEM FOR VEHICLES

BACKGROUND OF THE INVENTION

The present invention relates to a diagnosing method and apparatus for sensing a non-steady state malfunction in an electric system of an electronic control system for a vehicle.

Heretofore, in diagnosing such a malfunction during the inspection of the vehicle, it has been a common practice for a mechanic to sequentially track components of the electric system based on his experience or an inspection manual in accordance with a particular condition of malfunction of the electronic control system, to diagnose the malfunction. When a number of and various types of means for electrically sensing conditions of sensing points of the vehicle are included or when a logic for controlling signals from a control unit is complex, an inspecting checker or a diagnosing apparatus called a tester has been used.

In any event, however, it is easy to diagnose the malfunction when it occurs in steady state, but since the electronic control apparatus for the vehicle is normally used in a vibrating condition, a non-steady state and non-recurrent malfunction as represented by an incomplete contact or a partial break of a wire in an electric circuit occurs frequently, and it is impossible to detect such a malfunction particularly when the malfunction occurs in a short period of time. When the electronic control system is designed for a fuel injection apparatus which electronically calculates and controls the amount of fuel injection for an engine, the malfunction in the electric system affects the safety, the ability of purifying exhaust gas and the comfortable ride and hence there is a great need for raising a probability of finding the malfunction.

SUMMARY OF THE INVENTION

It is object of the present invention to provide a diagnosing method and apparatus which can find a malfunction with a very high probability by memorizing the occurence of any malfunction should it occur during a diagnose period for an electric system of an electronic control system.

It is another object of the present invention to enable simultaneous diagnosis of the malfunction for each electric signal or electric system of the electronic control system.

In accordance with the present invention, since the occurrence of any malfunction is memorized should it occur during a diagnose period for the electronic control system for the vehicle, the precision of finding the malfunction is very high and a low recurrent malfunction in the electric system can be found without substantial failure. Furthermore, the malfunctions can be simultaneously and independently diagnosed for each electric system of the electronic control system.

DESCRIPTION OF THE PREFERRED EMBODIMENTS

Figure 1:
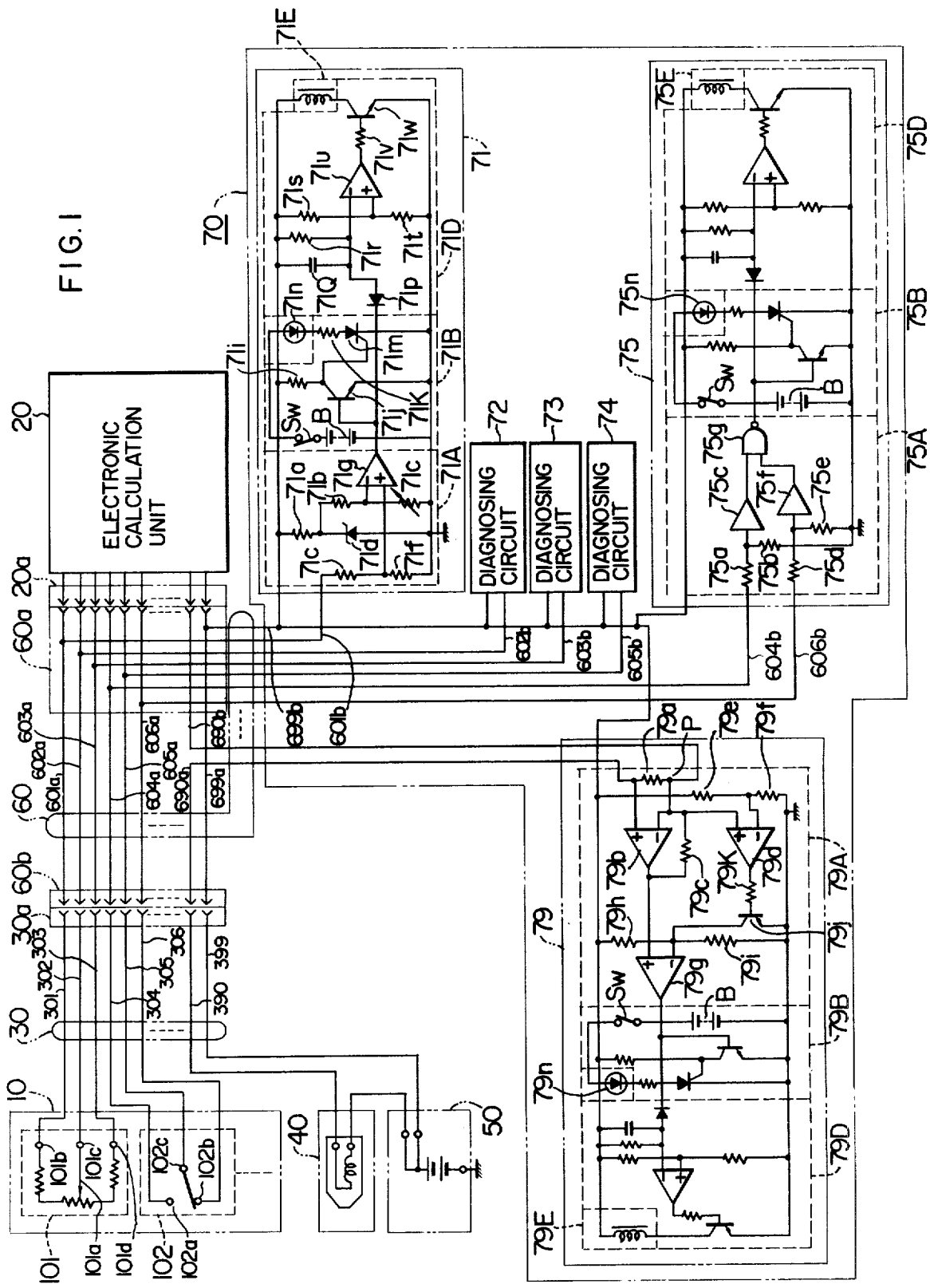
FIG. 1 shows a configuration of one embodiment of the present invention.

One embodiment of the present invention is now explained with reference to FIG. 1, which shows a schematic configuration of an electronic fuel injection control apparatus for calculating and controlling the amount of fuel injection for an engine and a detailed configuration of a malfunction diagnosing apparatus therefor. In FIG. 1, numeral 10 denotes a sensor group comprising a plurality of sensing means for sensing conditions of a plurality of sensing points of a vehicle, 101 denotes a conventional sensor for sensing the amount of suction air, which may be a known potentiometer having a slidable arm 101a slid in accordance with the amount of suction air to the engine and having three terminals, i.e. a constant voltage supply terminal 101b, an output terminal 101c and a ground terminal 101d which are connected to an electronic calculation unit 20 through three wire harnesses 301, 302 and 303. Numeral 102 denotes a known throttle switch having a fully-closed contact 102a which is closed when a throttle valve of the engine is fully closed, a wide-open contact 102b which is closed when an operture of the throttle valve is large and a switching contact 102c which is switched in response to the movement of the throttle valve. Those contacts are connected to the electronic calculation unit 20 through three wire harnesses 304, 305 and 306. The sensor group 10 further includes known rotation sensor, coolant temperature sensor and atmosphere temperature sensor for the electronic fuel injection control system, which sensors are connected to the electronic calculation unit 20 through respective wire harnesses, although not explained specifically. The electronic calculation unit 20 is of a known type which receives signals from the sensors 101, 102, . . . of the sensor group 10 and in response to those signals it calculates the amount of fuel to be fed to the engine, that is, the amount of fuel determined by a valve open period of a solenoid operated fuel injection valve 40 and turns on and off a current flowing in a coil of the fuel injection valve 40 to control the opening and closing of the valve. The fuel injection valve 40 which constitutes a drive control means is of a known type which is mounted on a controlled point or a suction system of the engine, that is, a suction manifold near a suction port of each cylinder of the engine. One terminal of the valve 40 is connected to the electronic calculation unit 20 through a wire harness 390 and the other terminal is connected to a positive terminal of a vehicle-mounted battery 50 through a wire harness. While only one fuel injection valve 40 is shown in FIG. 1, a plurality of such valves which correspond in number to the number of cylinders of the engine are normally arranged and connected in parallel. The positive terminal of the vehicle-mounted battery 50 is connected to the electronic calculation unit 20 through a wire harness 399 to supply a current thereto. A negative or ground terminal of the battery 50 is also connected to the electronic calculation unit 20 through a wire harness, although not shown. A wire harness group 30 connects the sensors in the sensor group 10, the fuel injection valve 40 and the vehicle-mounted battery 50 with the electronic calculation unit 20 through the wire harnesses 301–399. As is known well conventionally, the wire harness group 30 and the electronic calculation unit 20 are connected with each other by coupling a female connector 30a of the wire harness group 30 to a male connector 20a of the electronic calculation unit 20.

When the malfunction diagnosing apparatus for the electronic fuel injection control apparatus is to be connected during the inspection of the vehicle, the wire harness connector 30a and the calculation unit connector 20a are detached and a female connector 60a of a sub-wire harness connector group 60 is coupled to the calculation unit connector 20a while a male connector 60b is coupled to the wire harness connector 30a.

The sub-wire harness group 60 comprises sub-wire harnesses 601a, 602a, 603a, 604a, 605a, 606a, . . . , 699a, which connect the sensor group 10 and the vehicle-mounted battery 50 with the electronic calculation unit 20, and sub-wire harnesses 601b, 602b, 603b, 604b, 605b, 606b, . . . , 699b which branch from the sub-wire harnesses 601a, 602a, . . . , 699a in the connector 60a. The sub-wire harness which connects the fuel injection valve 40 with the electronic calculation unit 20 is the only exception and it comprises a sub-wire harness 690a for connecting a diagnosing circuit 70 to be described later with the fuel injection valve 40 and a sub-wire harness 690b for connecting the diagnosing circuit 70 with the electronic calculation unit 20. The diagnosing circuit 70 which is a principal portion of the malfunction diagnosing apparatus comprises level discrimination circuits 71, 72, 73 and 74, a logic discrimination and diagnose circuit 75 and a current discrimination and diagnose circuit 79.

The level discrimination circuit 71 comprises a discrimination circuit 71A which is connected to the constant voltage supply terminal 101b of the suction air amount sensor 101 through the sub-wire harness 601b and compares a voltage level applied to the constant voltage supply terminal 101b with a minimum reference level which has been set to the lowest level possible in a normal operation. The discrimination circuit 71A includes resistors 71a, 71b and 71c for establishing the minimum reference level, a zener diode 71d, resistors 71e and 71f for dividing the voltage applied to the constant voltage supply terminal 101b and a comparator 71g. Numeral 71B denotes a holding circuit which stores and holds the occurrence of malfunction when it has been determined by the discrimination circuit 71A, and it includes a self-contained power supply B, resistors 71i and 71k, a transistor 71j, an SCR 71m and a resetting normally-closed switch Sw. Numeral 71n denotes a light emitting diode which is fed with an output of the holding circuit 71B and functions as an indicating means for indicating the occurrence of malfunction. Numeral 71D denotes a counter driving circuit which is connected to the discrimination circuit 71A and increments a solenoid operated counter 71E each time the discrimination circuit 71A determines the occurrence of malfunction. It includes a diode 71p, a capacitor 71q, resistors 71r, 71s, 71t and 71v, a comparator 71u and a transistor 71w. The solenoid operated counter 71E may be of a known type having a digit wheel electromagnetically driven one increment at a time each time a malfunction occurs. Since the solenoid operated counter 71E generally has a function to hold the incremented state of the digit wheel, it has a dual function of the holding circuit 71B and the indicating means and it does not need the self-contained power supply B whereas the holding circuit 71B needs the self-contained power supply B to maintain the display by the light emitting diode 71n which functions as the indicating means.

The operation of the level discrimination circuit 71 is now explained. When the voltage level applied from the electronic calculation unit 20 to the constant voltage terminal 101b of the suction air amount sensor 101 of the sensor group 10 falls below the permissible level or the minimum reference level determined by the discrimination circuit 71A by a malfunction such as a break of wire or short circuit, the output of the comparator 71g and hence the output of the discrimination circuit 71A assumes a LOW level. As a result, the transistor 71j of the holding circuit 71B is turned off and a voltage is applied to a gate of the SCR 71m to turn it on. Consequently, the indicating light emitting diode 71n is energized through the self-contained power supply B to indicate the occurrence of malfunction. Once the light emitting diode 71n has been energized, it remains energized even after a normal condition has been recovered, that is, after the voltage level applied to the constant voltage source terminal 101b of the suction air amount sensor 101 has been restored to a normal level. Therefore, any low recurrent (or hard-to-find) non-steady state malfunction such as a break, short circuit or partial contact in the electric system can be positively found without failure. As the output of the discrimination circuit 71A assumes the LOW level, the capacitor 71q in the counter driving circuit 71D is charged instantly so that a level at an inverting terminal of the comparator 71u falls. As a result, the output of the comparator 71u assumes a HIGH level to turn on the transistor 71w which in turn energizes the solenoid operated counter 71E so that the digit wheel is rotated to increment the count by one. Even when the period during which the discrimination circuit 71A produces the LOW level output is very short (that is, when the voltage level applied to the constant voltage supply terminal 101b of the suction air amount sensor 101 falls momentarily below the permissible level by the partial contact or the like), the level at the inverting terminal of the comparator 71u does not rise rapidly because the capacitor 71q in the counter driving circuit 71D is discharged slowly. As a result, the comparator 71u produces the HIGH level signal having a more than predetermined duration. Therefore, the solenoid operated counter 71E is positively driven whenever malfunction occurs.

The light emitting diode 71n and the solenoid operated counter 71E continue to indicate the occurrence of malfunction even after the diagnosing circuit 70 has been disconnected from the electronic calculation unit 20 or after the malfunction diagnosing apparatus has been detached from the electronic fuel injection control system. The solenoid operated counter 71 can even indicate the number of times of the occurrence of malfunction. While both the light emitting diode 71n and the solenoid operated counter 71E are used in the illustrated embodiment, it should be understood that only one of them may be used to attain the function of indicating the occurrence of malfunction.

The other level discrimination and diagnose circuits 72, 73 and 74 are substantially similar to the level discrimination and diagnose circuit 71 described above and hence they are not explained in detail. The level discrimination and diagnose circuit 73 determines the abnormal condition in the voltage level applied to the ground terminal 101d of the suction air amount sensor 101 so that it is constructed to compare the voltage level at the terminal 101d with a maximum reference level which has been set to the highest level allowable. Only this feature differs from the level discrimination and diagnose circuit 71.

Instead of the simple comparators which compare the levels of the input signals with the reference levels, the level discrimination and diagnose circuits 71, 72, 73 and 74 may include so-called window-type comparators which determine whether the levels of the input signals are within a predetermined range.

The logic discrimination and diagnose circuit 75 is now explained. Numeral 75A denotes a discrimination circuit which comprises a buffer amplifier 75c having resistors 75a and 75b which are connected to the fully-closed contact 102a of the throttle switch 102, a buffer amplifier 75f having resistors 75d and 75e which are connected to the large-aperture contact 102b of the throttle switch 102, and a NAND gate 75g to which outputs of the amplifiers 75c and 75f are applied. Numeral 75B denotes a holding circuit, 75n denotes a light emitting diode, 75D denotes a counter driving circuit and 75E denotes a solenoid operated counter, which are identical to the holding circuit 71B, the light emitting diode 71n, the counter driving circuit 71D and the solenoid operated counter 71E, respectively, of the level discrimination and diagnose circuit 71 described above, and hence they are not explained in detail.

The operation of the logic discrimination and diagnose circuit 75 is explained below. When the throttle valve of the engine is fully closed such as in an idling condition of the engine, the fully-closed contact 102a of the throttle switch 102 is closed so that the potential at the contact 102a is at HIGH level and the buffer amplifier 75c of the discrimination circuit 75A also produces the HIGH level signal. When the throttle valve is highly opened such as in a heavy load condition of the engine, the wide-open contact 102b of the throttle switch 102 is closed so that the potential at the contact 102b assumes the HIGH level and the buffer amplifier 75f of the discrimination circuit 75A also produces the HIGH level signal. In the normal operation of the throttle switch 102, the two contacts 102a and 102b are not closed simultaneously but the potential of one of the contacts (i.e. the output of one of the buffer amplifiers) is LOW level. Therefore, in the normal condition, the NAND gate 75g produces the HIGH level signal. However, if any abnormal condition in which both the contacts 102a and 102b are at HIGH level occurs by a malfunction such as leakage or break in the electric system including the contacts 102a and 102b of the throttle switch 102, the NAND gate 75g and hence the discrimination circuit 75A produce the LOW level signals to cause the holding circuit 75B to energize the light emitting diode 75n and cause the counter driving circuit 75D to increment the solenoid operated counter 75E to indicate the occurrence of the malfunction.

The current discrimination and diagnose circuit 79 is now explained. Numeral 79A denotes a discrimination which comprises the following components: Numeral 79a denotes a low-resistance current sensing resistor inserted in series with the sub-wire harnesses 690a and 690b. Numeral 79b denotes a differential amplifier having a feedback resistor 79c for amplifying a voltage across the current sensing resistor 79a. Numeral 79d denotes a comparator for determining whether a current is being supplied to the fuel injection valve 40 by comparing a potential at one end P of the current sensing resistor 79a with a comparison level determined by resistors 79e and 79f. The comparator 79d produces a HIGH level signal when the current is not being supplied to the fuel injection valve 40. Numeral 79g denotes a comparator for determining whether a current which is higher than a predetermined level is being supplied to the current sensing resistor 79a (that is, whether a current which is higher than a predetermined level is being supplied to the fuel injection valve 40) by comparing an output of the differential amplifier 79b with a comparison level determined by resistors 79h and 79i. The comparator 79g produces a LOW level signal when the current supplied is below the predetermined level. Numeral 79j denotes a transistor to which the output of the comparator 79d is supplied through a resistor 79k. The transistor 79j is conductive when the output of the comparator 79d is HIGH level, that is, when the current is not supplied to the fuel injection valve 40, to lower the comparison level determined by the resistors 79h and 79i to ground potential. Numeral 79B denotes a holding circuit, 79n denotes a light emitting diode, 79D denotes a counter driving circuit and 79E denotes a solenoid operated counter, which are identical to the holding circuit 71B, the light emitting diode 71n, the counter driving circuit 71D and the solenoid operated counter 71E described above, respectively, and hence they are not explained in detail.

The operation of the current discrimination and diagnose circuit 79 is now explained. The electronic calculation unit 20 calculates the amount of fuel to be fed to the engine based on the signals from the sensor group 10 to cause a current to supply to the fuel injection valve 40 for a time period corresponding to the calculated amount of fuel. During the time period of fuel supply, a current is supplied to the current sensing resistor 79a in the discrimination circuit 79A from the vehicle-mounted battery 50 through the fuel injection valve 40, the wire harness 390a and the sub-wire harness 690a, thence to the electronic calculation unit 20 through the sub-wire harness 690b. The magnitude of the current is sensed by a voltage across the current sensing resistor 79a in the discrimination circuit 79A and the sensed voltage is amplified by the differential amplifier 79b at a predetermined amplification factor. The amplified voltage is compared with the predetermined comparison level in the comparator 79g. If the current flowing in the fuel injection valve 40 falls below the predetermined level by the occurrence of the malfunction such as leakage or partial contact, the comparator 79g and hence the discrimination circuit 79A produce the LOW level signals which cause the holding circuit 75B to energize the light emitting diode 75n and cause the counter driving circuit 75D to increment the solenoid operated counter 75E to indicate the occurrence of the malfunction.

During the period in which the current is supplied to the fuel injection valve 40, the potential at the one end P of the current sensing resistor 79a is low or approximately equal to ground potential, but during the period in which the current is not supplied to the fuel injection valve 40, the potential at the one end P of the resistor 79a rises above the comparison level of the comparator 79d of the discrimination circuit 79A. Consequently, the comparator 79d produces the HIGH level output to turn on the transistor 79j to lower the comparison level of the other comparator 79h to the ground level (LOW level). As a result, whenever the current is not supplied to the fuel injection valve 40, the comparator 79h produces the HIGH level signal so that the current is not discriminated.

While the holding circuits 71B, 75B and 79B of the discrimination and diagnose circuits 71, 75 and 79, respectively, have their own self-contained power supplies B in the illustrated embodiment, a common self-contained power supply B may be used for those circuits.

Furthermore, while only the discrimination and diagnose circuits 71, 72, 73, 74, 75 and 79 of the diagnosing circuit 70 have been shown in the illustrated embodiment, it should be understood that similar discrimination and diagnose circuits may be provided for the other sensors, not shown, of the sensor group 10.

Figure 2:
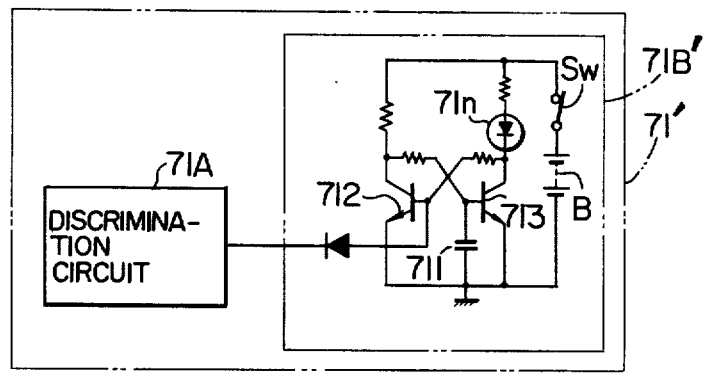
FIGS. 2 and 3 show electric circuit diagrams of other embodiments of the present invention.

Furthermore, while the holding circuit 71B of the discrimination and diagnose circuits (as represented by the level discrimination and diagnose circuit 71) of the diagnosing circuit 70 has been shown to have the memory and holding function by the SCR 71m, an R-S flip-flop shown in a diagnosing circuit 71' shown in FIG. 2 may be used. In the circuit of FIG. 2, when the self-contained power supply B is connected to the flip-flop through a resetting normally-closed switch Sw, a transistor 712 is turned on by the function of a resetting capacitor 711 while a transistor 713 is rendered nonconductive so that the light emitting diode 71n is not energized. When the discrimination circuit 71A produces the LOW level signal at the occurrence of malfunction, the transistor 712 is turned off while the transistor 713 is turned on to energize the light emitting diode 71n to indicate the occurrence of malfunction. Alternatively, various means having a memory and holding function of the holding circuit such as a fuse memory or a magnetic tape may be used.

While the light emitting diode and the solenoid operated counter are used as the indicating means in the illustrated embodiment, a lamp, an electroluminescense, a liquid crystal or a fluorescent lamp may be used for flash displaying or count displaying.

Where a circuit impedance of a transfer circuit for the air-fuel ratio sensor output signal is so high that there may be a possibility of adverse affect by the insertion of the diagnosing circuit 70, buffer amplifiers may be inserted before the discrimination circuits 71A, ..., 79A of the discrimination and diagnose circuits 71, ..., 79 of the diagnosing circuit.

Figure 3:
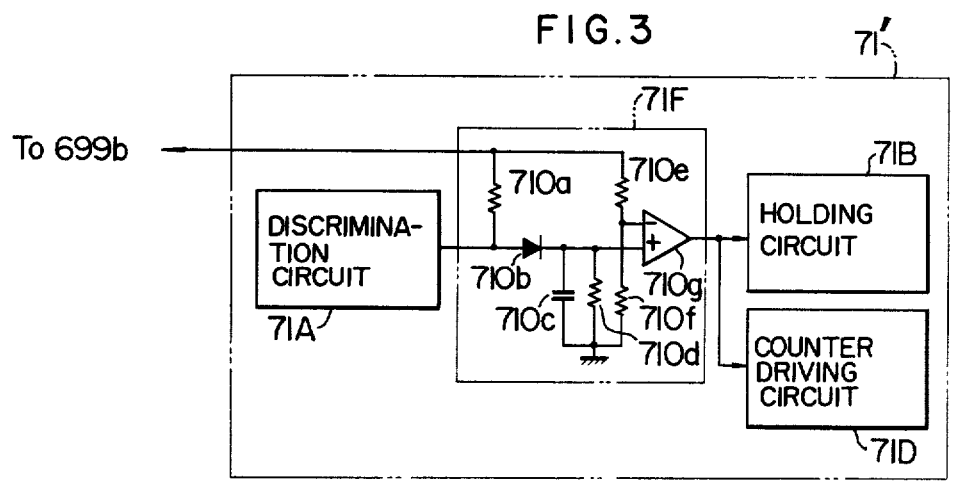

In the illustrated embodiment, chattering may occur during the normal operation condition depending on the particular sensors in the sensor group 10. In this case, as shown in a diagnosing circuit 71" shown in FIG. 3, a timer circuit 71F comprising resistors 710a, 710d, 710e and 710f, a diode 710b, a capacitor 710c and a comparator 710g may be connected downstream of the discrimination circuit 71A of the discrimination and diagnosing circuits (as represented by the level discrimination and diagnose circuit 71) of the diagnosing circuit 70. In the circuit of FIG. 3, unless the output of the discrimination circuit 71A maintains the LOW level signal for more than a predetermined time period determined by the discharge time of the capacitor 710c, the comparator 710g does not produce the LOW level signal. Consequently, the chattering of the sensor is not erroneously determined as the malfunction.

While the illustrated embodiment is shown to be applied to the electronic fuel injection control system for calculating and controlling the amount of fuel injection to the engine in the electronic control system for the vehicle, it should be understood that the present invention can be applied to various electronic control systems such as a system for electronically controlling an ignition timing of the engine or a system for preventing locking of wheels when the brakes are applied to a vehicle.

We claim:

1. In combination with an electronic control system for vehicles, said electric control system having a battery, a sensor energized by said battery for converting a sensed vehicle condition into an electric condition voltage, an actuator having a winding energizable by said battery for controlling a vehicle operation, and an electronic calculation unit connected between said sensor and said actuator, for producing a pulse signal which enables said winding to be energized in response to said electric condition voltage, a malfunction diagnosing apparatus comprising:

first connecting means detachably connected to said sensor for deriving a voltage supplied to energize said sensor;

first comparing means for comparing said voltage derived by said first connecting means with a first reference value indicative to an allowable minimum energizing voltage;

first memorizing means for memorizing a malfunction in response to a first output of said first comparing means, said first output being indicative of said voltage derived by said first connecting means being smaller than said first reference value;

first displaying means for displaying said malfunction memorized by said first memorizing means;

second connecting means detachably connected to said actuator for deriving a voltage proportional to a current flowing through said winding when said pulse signal is produced by said electronic calculation unit;

second comparing means for comparing said voltage derived by said second connecting means with a second reference value indicative of a required minimum energizing current;

second memorizing means for memorizing a malfunction in response to a second output of said comparing means, said second output being indicative of said voltage derived by said second connecting means being smaller than said second reference value; and second displaying means for displaying said malfunction memorized by said second memorizing means.

2. A malfunction diagnosing apparatus according to claim 1 further comprising:

third connecting means detachably connected to said sensor for deriving said condition voltage;

third comparing means for comparing said condition voltage derived by said third connecting means with a third reference value indicative of an allowable maximum condition voltage;

third memorizing means for memorizing a malfunction in response to a third output of said third comparing means, said third output being indicative of said condition voltage derived by said third connecting means being larger than said third reference value; and third displaying means for displaying said malfunction memorized by said third memorizing means.

3. A malfunction diagnosing apparatus according to claim 2 further comprising:

resetting means for resetting said first, second and third memorizing means to extinguish displaying operations of said first, second and third displaying means.

* * * * *